US008355734B2

(12) United States Patent
Naden et al.

(10) Patent No.: US 8,355,734 B2
(45) Date of Patent: Jan. 15, 2013

(54) WIRELESS SYSTEM

(75) Inventors: James Mark Naden, Hertford (GB); Peiying Zhu, Kanata (CA)

(73) Assignee: Apple Inc., Cupertino, CA (US)

(*) Notice: Subject to any disclaimer, the term of this patent is extended or adjusted under 35 U.S.C. 154(b) by 764 days.

(21) Appl. No.: 12/187,961

(22) Filed: Aug. 7, 2008

(65) Prior Publication Data

US 2010/0035620 A1   Feb. 11, 2010

(51) Int. Cl.
 *H04W 72/00* (2009.01)
(52) U.S. Cl. ....... 455/450; 455/436; 455/561; 455/11.1; 375/260; 370/315; 370/329; 370/338
(58) Field of Classification Search .......... 455/11.1, 455/450, 436, 561; 370/315, 329, 338; 375/260
See application file for complete search history.

(56) References Cited

U.S. PATENT DOCUMENTS

| | | | |
|---|---|---|---|
| 2007/0087690 A1* | 4/2007 | Karabinis | 455/12.1 |
| 2007/0155315 A1* | 7/2007 | Lee et al. | 455/11.1 |
| 2007/0197161 A1* | 8/2007 | Walke et al. | 455/7 |
| 2008/0045174 A1* | 2/2008 | Chen et al. | 455/187.1 |
| 2008/0165866 A1* | 7/2008 | Teo et al. | 375/260 |
| 2009/0247172 A1* | 10/2009 | Palanki et al. | 455/447 |

FOREIGN PATENT DOCUMENTS

| | | |
|---|---|---|
| EP | 1804442 A1 | 7/2007 |
| EP | 2088814 A2 | 8/2009 |

OTHER PUBLICATIONS

IEEE 802.16, "The Draft IEEE 802.16m System Description Document", Jul. 29, 2008, pp. 1-88.
"Part 16: Air Interface for Fixed and Mobile Broadband Wireless Acess Systems", Jul. 23, 2008, pp. 1, 196-249.

* cited by examiner

*Primary Examiner* — Kamran Afshar
*Assistant Examiner* — Yousef Rod
(74) *Attorney, Agent, or Firm* — Meyertons, Hood, Kivlin, Kowert & Goetzel, P.C.

(57) ABSTRACT

The capacity of a cellular wireless system is increased by operation of base stations or base station sectors arranged to re-use radio resource elements that are used by neighboring base stations or base station sectors, in conjunction with operation of relay stations, which are similarly arranged to re-use radio resource elements used by neighboring relay stations, and where the radio resource elements re-used by the relay stations are different to those used by the base stations. The relay stations provide coverage, particularly in the areas at the boundaries between the areas of coverage of base stations that suffer from interference between signals transmitted from the respective base stations. In addition, the relay stations generally increase the average available carrier to interference ratio compared with a system in which base stations alone are deployed. The scheme for the allocation of radio resource elements ensures in particular that interference is avoided between signals transmitted from a base station and signals transmitted from a relay station in radio resource elements allocated to control data.

29 Claims, 13 Drawing Sheets

WIRELESS SYSTEM

FIELD OF THE INVENTION

The present invention relates generally to wireless communications networks, and more specifically to a method and a system relating to multi-hop or relay enhanced cellular wireless systems.

BACKGROUND OF THE INVENTION

Mobile telephony systems in which user equipment such as mobile handsets communicate via wireless links to a network of base stations connected to a telecommunications network have undergone rapid development through a number of generations. The initial deployment of systems using analogue modulation has been superseded by second generation digital systems, which are themselves currently being superseded by third generation digital systems such as UMTS and CDMA. Third generation standards provide for a greater throughput of data than is provided by second generation systems; this trend is continued with the proposal by the Third Generation Partnership Project of the so-called Long Term Evolution system, often simply called LTE, which offers potentially greater capacity still, by the use of wider frequency bands, spectrally efficient modulation techniques and potentially also the exploitation of spatially diverse propagation paths to increase capacity (Multiple In Multiple Out).

Distinct from mobile telephony systems, wireless access systems have also undergone development, initially aimed at providing the "last mile" (or thereabouts) connection between user equipment at a subscriber's premises and the public switched telephone network (PSTN). Such user equipment is typically a terminal to which a telephone or computer is connected, and with early systems there was no provision for mobility or roaming of the user equipment between base stations. However, the WiMax standard (IEEE 802.16) has provided a means for such terminals to connect to the PSTN via high data rate wireless access systems.

Whilst WiMax and LTE have evolved via different routes, both can be characterised as high capacity wireless data systems that serve a similar purpose, typically using similar technology, and in addition both are deployed in a cellular layout as cellular wireless systems. Typically such cellular wireless systems comprise user equipment such as mobile telephony handsets or wireless terminals, a number of base stations, each potentially communicating over what are termed access links with many user equipments located in a coverage area known as a cell, and a two way connection, known as backhaul, between each base station and a telecommunications network such as the PSTN.

FIG. 1 shows a conventional wireless cellular network; in this example, the access links of base stations $2a \ldots 2g$ are arranged in a so called "n=3" frequency reuse pattern, that is to say that the available wireless frequency spectrum is divided into three sub-bands f1, f2 and f3, in which n signifies the number of sub-bands. The area of coverage of each base station is divided into three sectors by the use of directional antennas, and each of the sectors operates in a different frequency sub-band. In the example of FIG. 1, the sectors indicated by reference numerals $1a$, $1b$ and $1c$ associated with the base station indicated by reference numeral $2a$ operate in frequency sub-bands f1, f2 and f3 respectively. It can be seen that the frequency re-use pattern shown in FIG. 1 can be repeated without adjacent sectors operating at the same frequency, thereby minimising interference between adjacent sectors. Sub-bands need not necessarily consist of contiguous blocks of frequencies, indeed there may be some advantage in interleaving the frequencies in order to distribute the effect of frequency selective fades. A frequency selective fade is a reduction in signal power due to destructive interference between multipath components. In cellular systems employing orthogonal frequency division multiplexing (OFDM) such as, for example WiMax or LTE, a sub-band will typically comprise a non-contiguous groups of sub-carriers; However, for clarity the sub-bands are often illustrated as being separate contiguous blocks, in which the numerical designation of a frequency has an arbitrary relationship with the actual frequency at the physical layer.

FIG. 1 is a schematic diagram in which sectors $1a$, $1b$, $1c$ are shown as hexagonal areas; in practice, geographical constraints and propagation conditions will cause the area of coverage of each sector to be irregular in shape and the areas of sectors to be unequal and the spacing of base stations will be determined by available sites and will not necessarily correspond to the idealised situation shown in FIG. 1.

There may be gaps in the area of coverage of a cellular system due to shadowing by the terrain or by interference between signals transmitted by base stations. Conventionally these gaps may be countered by the use of repeater stations that receive signals from a base station and re-transmit them into an area where coverage is poor. However, a repeater station that simply retransmits all signals received within a band may cause interference that reduces coverage in other areas. The interference may be reduced by using a relay station instead of a repeater station; a relay station selects which signals to retransmit, typically transmitting to terminals within the area of poor coverage.

Typically, a relay station is a small low power base station with an omni-directional antenna, in contrast to a conventional base station, which typically operates with a higher transmit power than a relay station, and typically employs directional antennas that are mounted on a tower to give an extensive area of coverage. The radio resource of the cellular wireless system may be used to relay backhaul traffic between a relay station and a conventional base station.

FIG. 2 shows a conventional relay station operating within a cellular wireless network; the operation may for example be in accordance with IEEE 802.16j. A user equipment $12b$ is in communication with a relay station $10$. As the relay station $10$ is not provided with a backhaul link separate from the cellular wireless resource, the relay station is allocated radio resource timeslots for use relaying backhaul data to and from the adjacent base station $2a$ which is itself connected by microwave link to a microwave station $6$ and thence to a telecommunications network $8$ such as the public switched telephone network. A user equipment $12a$ is shown in direct communication with the base station $2a$.

The relay station $10$ may be deployed in an area partially obscured from base stations by a geographical feature such as a hill or another obstruction such as buildings, or within a building to give coverage to parts of the building that experience a poor link or no coverage from a base station. The relay station $10$ is positioned such that it can communicate with a base station, and also give coverage to an obscured area. Typically, the relay station is required to give coverage to a smaller area than that covered by a base station sector. Conventionally, relay stations are used to cover a small proportion of the area of wireless coverage of the cellular wireless system, and the coverage areas of relay stations rarely overlap each other. In such a conventional low density deployment of relay stations, the allocation of operating frequencies to relay stations for communication with user equipment may be carried out in an ad hoc manner; it may be acceptable to re-use the frequency sub-band allocated to the base station sector within which the relay station is deployed, if the area of overlap is small between the coverage of the relay station and that of the base station. Alternatively, a different sub-band may be allocated to the relay station from that allocated to the base station sector within which the relay station is deployed. Provided that the area of coverage of the relay station is small, the potential for interference with signals in other base station sectors and with signals from other relay stations may not be an issue.

However, there is potentially an advantageous use of relay stations for the purpose of increasing the capacity of a wireless cellular network in general, not limited to situations in which parts of the target areas of coverage are obscured from base stations. Such a general use of relay stations could potentially involve a high density deployment of relay stations within a base station sector, such that the coverage areas of relay stations may overlap with each other and also overlap substantially with the areas of coverage of base station sectors. The potential advantage of such a deployment is that relay stations would provide local areas of signal reception in which the carrier to interference ratio is improved over that provided by the base stations alone. However, it may be problematic to allocate frequency sub-bands to relay stations deployed within a conventional cellular wireless network employing n=3 frequency re-use in a way that does not result in interference.

FIG. 3 illustrates the potential problems of deployment of relay stations $10a \ldots 10c$ within a cellular wireless system using an n=3 frequency re-use scheme, showing the area of coverage of two base stations $2a$, $2b$. Three relay stations $10a \ldots 10c$ are deployed within the area of coverage of the base stations $2a$, $2b$, and three user equipments $12a \ldots 12c$ are shown. A given user equipment $12a$ can receive signals from both a base station $2a$ and a relay station $10a$. The user equipment $12a$ will hand over to use whichever of the base station $2a$ and relay station $10a$ provides the highest quality signal, which quality may be expressed in terms of carrier to interference ratio. The aim of the hand over process is to increase the average carrier to interference ratio available within the area of coverage of the wireless cellular system and hence increase the traffic capacity, since the traffic capacity is related to the carrier to interference ratio.

The allocation of frequency sub-bands to the system as illustrated by FIG. 3 is problematic, taking, for example, the case of the relay station indicated by reference numeral $10a$. If this relay station $10a$ were to be operated at frequency sub-band f1 as used by base station sector $1a$, there is potential for interference between signals transmitted from relay station $10a$ and those transmitted by the base station $2a$. If the relay station $10a$ were to be operated at frequency sub-band f2, there is potential for interference between signals transmitted from relay station $10a$ and those transmitted by the base station $2b$ in the sector $1e$ in communication with user equipment $12b$. In the case that the relay station $10a$ were to be operated at frequency sub-band f3, there is potential for interference between signals transmitted from relay station $10a$ and those transmitted by the base station $2a$ in the sector $1c$ in communication with user equipment $12c$.

FIG. 4 shows a conventional time frame structure allocating timeslots alternately to access $14a \ldots 14d$ and to backhaul, also referred to as "relay" $16a \ldots 16c$ between a relay station $10$ and an associated base station $2$, in a system such as that illustrated in FIG. 2.

FIG. 5 shows an example of the conventional allocation of radio resource within each of the access time slots $14a \ldots 14d$ of the frame structure of FIG. 4. In a system not employing relays, the relay timeslots may be absent, so that the access timeslots are contiguous in time. The radio resource is split in frequency into three sub-bands f1, f2, f3 for use in a n=3 re-use pattern such as that illustrated in FIG. 1. It can be seen that each frequency sub-band is divided in the time dimension into control timeslots $18a \ldots 18c$ and payload $20a \ldots 20c$ timeslots, and that the control timeslots $18a \ldots 18c$ for the frequency sub-bands f1, f2 and f3 coincide with one another in time. This coinciding in time occurs since a user equipment receiver $12a$, $12b$ is synchronised to the radio resource frame structure and the receiver $12a$, $12b$ is pre-programmed in accordance with the relevant cellular wireless standard such as, for example, the WiMax or LTE standard, to expect to receive control data at the same time in each sub-band. An example of the data that would form part of the control timeslot $18a \ldots 18c$ is the frame control header (FCH) in the 802.16 WiMax system. Similarly, in the case of LTE systems, there are control timeslots which may be located at various positions within the data frame; for example, control timeslots may be located at the beginning, middle and end of a frame. In general, control traffic may, for example, indicate the size of a frame and its start and stop addresses.

In order to receive the payload part $20a \ldots 20c$ of a frame, it is necessary to receive the respective control timeslot $18a \ldots 18c$ associated with the frame. It is thus particularly important that the control timeslots $18a \ldots 18c$ be protected from interference. In the n=3 frequency reuse scheme illustrated by FIG. 1, interference between control timeslots of signals transmitted by adjacent sectors of any given base station $2a$ is inherently minimised since, as has already been mentioned, adjacent sectors operate at different frequency sub-bands.

Typically, the information carried by the control timeslots will vary between base stations and between base station sectors. Therefore, techniques that mitigate the effects of interference between base stations and between base station sectors by the intelligent combination of potentially interfering signals that carry the same information are not generally applicable for use with control timeslots. For example, soft handover and best server selection methods are generally not applicable for use with the control timeslot as they would impose the limitation that the information content of potentially interfering signals would be the same.

While it may be possible to control the allocation of radio resource within the payload part of the frame $20a$, $20b$, $20c$ to avoid interference between signals from the base station $2$ and the relay station $10$, it is typically not possible to re-allocate the radio resource used for control data $18a$, $18b$, $18c$, since this is typically defined within the relevant cellular wireless standard to occur at pre-defined positions within the frame structure. User equipment operating to the relevant standard is thus pre-programmed to expect control data at the pre-defined positions within the frame structure. Therefore, if the same sub-band is allocated to the relay station $10$ as to the base station $2$, there is the potential for interference to occur between control data transmitted from the base station $2$ and control data transmitted from the relay station $10$.

In practice, relay stations are of most value when placed at the extremes of coverage of a base station sector, since it is here that augmentation of coverage are most likely to be required, but it is also in this situation that interference is most likely to be caused. In addition, interference may be experienced between transmissions from adjacent relay stations which may be operating in the same sub-band.

The use of a relay station within the area of coverage of a conventional cellular wireless network using n=3 frequency re-use thus can potentially cause interference with signals transmitted from base stations and with signals transmitted from neighbouring relay stations.

It is an object of the present invention to provide methods and apparatus which addresses these disadvantages.

SUMMARY OF THE INVENTION

In accordance with a first aspect of the present invention, there is provided a method of allocating radio resource within a frame structure in a cellular wireless network, the network comprising a plurality of base stations and a plurality of relay stations, the frame structure comprising a plurality of first radio resource elements for the communication of control data, the method comprising allocating one or more elements of the plurality of first radio resource elements for communication of control data by the base stations; and allocating one or more different elements of the plurality of first radio resource elements for communication of control data by the relay stations.

The benefit of this method is that interference is prevented between control data transmitted by a base station and control data transmitted by a relay station as received at user equipment. For example, a base station may be equipped to give wireless coverage to a sector and a relay station may be operating within the area of coverage of the base station. A user equipment may be pre-programmed to receive control data within a radio resource element or elements that may for example be a control timeslot within a frame structure allocating radio resource within a network.

Preferably, the frame structure comprises a plurality of second radio resource elements for the communication of payload data, the method comprising allocating one or more elements of the plurality of second radio resource elements for communication of payload data by the base stations; and allocating one or more different elements of the plurality of second radio resource elements for communication of payload data by the relay stations. This has the benefit that a high payload data capacity can be transmitted by the re-use of radio resource elements amongst base stations, and also by the re-use of different radio resource elements amongst relay stations. The proportion of payload radio resource allocated to the base stations in relation to that allocated to the relay stations may be in proportion to expected load conditions, thus giving an efficient use of radio resource; the proportion need not be the same as that the proportion of control data radio resource allocated to the base stations in relation to that allocated to the relay stations, which is related to the control data protocol.

Preferably, the radio resource elements are distinguished by time and/or frequency. For example, a base station may be equipped to give wireless coverage to a sector and a relay station may be operating within the area of coverage of the base station. A user equipment may be pre-programmed to receive control data in a control timeslot within a frame structure allocating radio resource within a network. The allocation of control data from the base stations and relay stations to respective frequency sub-bands that do not overlap prevents interference between the control data from the base stations and that from the relay stations. Thus, control data from the base stations and relay stations may be allocated to respective timeslots or parts of timeslots that do not overlap in time thereby preventing interference between the control data from the base stations and that from the relay stations. It will be apparent to one skilled in the art that a signal carried by a radio resource element will not interfere with signals carried by a different radio resource elements, since radio resource elements are orthogonal to one another.

Advantageously, the wireless cellular network uses orthogonal frequency division multiplexing. For example, frequency sub-bands may comprise sets of orthogonal frequency division multiplexing (OFDM) subcarriers. As a result signals transmitted from a base station and a relay station may be received by means of a single OFDM receiver at a user equipment that receives a band encompassing the sub-bands used by the base stations and the relay stations. Thus, handover between the base stations and relay stations is facilitated. The allocation of OFDM sub-carriers to sub-bands can follow any pattern; subcarriers allocated to different sub-bands may typically be interleaved in frequency. This has the benefit of distributing between sub-bands the effects of a frequency selective fade.

Preferably, the base stations transmit at a higher transmission power than the relay stations. The benefit is that the relay stations may be cheaply constructed and used in a cost effective manner to improve the average carrier to interference ratio in areas where the carrier to interference ratio provided by the base stations is limited.

Typically, the base stations employ directional antennas and the relay stations employ omni-directional antennas. As a result base stations may be deployed to give sectorised coverage, that is to say that frequencies are re-used between sectors of the azimuth plane surrounding a base station. This implementation is efficient in minimising the number of base station sites, which is beneficial in that these may be relatively expensive high power devices with antennas mounted on towers. By contrast, relay stations may be small, cheap devices with omni-directional antennas which are preferably distributed in greater numbers than base stations to improve the carrier to interference ratio in the area of wireless coverage, but which do not involve so great infrastructure costs per base station, due to their small, low power nature and typical lack of an antenna tower.

Advantageously, a base station employs dedicated backhaul, for example a fibre or microwave link. A relay station typically uses radio resource occupying the same frequency band used for communication between the relay station and user equipment to provide backhaul of data to a base station. The benefit is that relay stations can be deployed economically to provide augmentation of the coverage area of a base station or to improve the carrier to noise ratio available within the coverage area without the expense and geographical limitation of providing dedicated backhaul. The relay stations may conveniently be operated substantially to the IEEE 802.16j standard.

Preferably, the network is configured such that regions of coverage in which signals from base stations suffer interference do not coincide with regions of coverage in which signals from relay stations suffer interference. The benefit is that the base stations may be operated with a n=1 frequency reuse scheme that gives high capacity close to base stations at the cost of interference at the boundaries between the areas of coverage of base station. Similarly, the relay stations can operate a n=1 frequency reuse scheme at a separate frequency sub-band from those used by the base stations. Provided the boundary regions associated with the base stations and the relay stations do not coincide, the network can provide efficient use of the spectrum as a user equipment can receive signals from whichever base station or relay station is providing the best carrier to interference ratio and hence the best data capacity at a given location in the network.

The base stations and relay stations may be configured under the control of a scheduler or network management system so that transmission and reception is arranged using radio resource elements allocated by the scheduler or network management system. For example, a sub-set of OFDM sub-carriers constituting a frequency sub-band to be used by base stations may be defined by a network management system and communicated to the base station using a dedicated wired backhaul link. The information relating to the sub-set of OFDM sub-carriers constituting a frequency sub-band to be used by relay stations may similarly be communicated to relay stations from the network management system for example via the base stations using timeslots dedicated for backhaul.

Radio resource allocation for payload may then be communicated to user equipment typically using a section of the pre-amble of a transmission, such as the frame control header or Map; this pre-amble constitutes control data, and uses radio resource whose relationship with a frame structure to which the handset is synchronised is pre-programmed into the handsets. The radio resource used by the control data is typically arranged into duplicate sections, known as segments, defined in the standard to which the wireless system operates, so that a user equipment may use any of the duplicate sections to receive control data. The selection of which of the duplicate sections to use is made by the network management system and communicated as described to the base stations and relay stations as appropriate; the user equipment simply listens to the radio resource that it was pre-programmed to receive in accordance with the wireless system standard.

Further features and advantages of the invention will become apparent from the following description of preferred embodiments of the invention, given by way of example only, which is made with reference to the accompanying drawings.

DETAILED DESCRIPTION OF THE INVENTION

In general, the present invention is directed to methods and apparatus that are aimed to increase the capacity or coverage of a cellular wireless system by the use of relay stations. For clarity, the methods and apparatus are described in the context of a high speed packet data system such as IEEE802.16 (WiMax) or LTE, but it will be appreciated that this is by way of example and that the methods and apparatus described are not limited to these examples.

As a result of the problems of interference mentioned above, the potential capacity increase offered by the use of relay stations within a cellular wireless network using a conventional n=3 frequency reuse scheme is limited.

Figure 5:
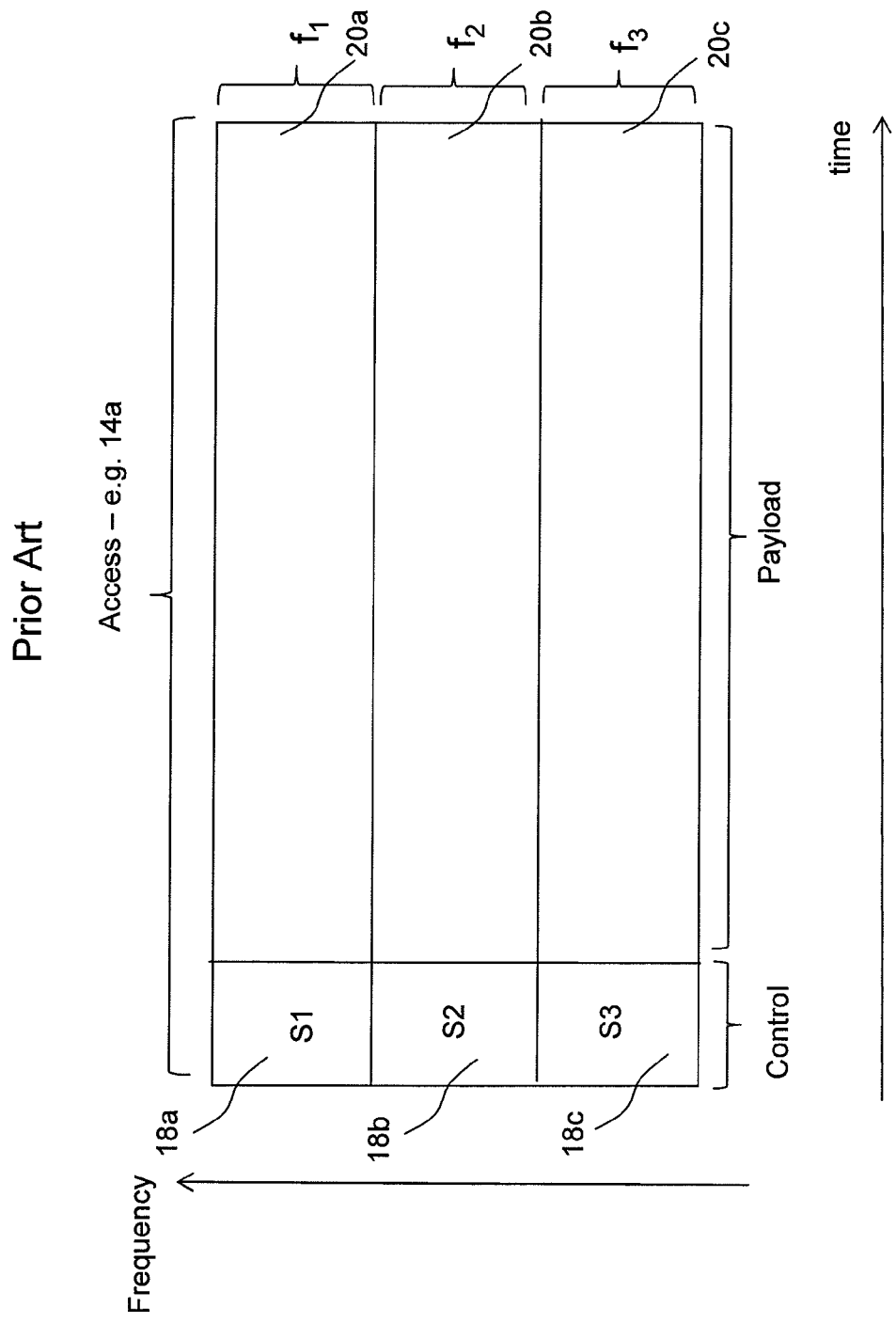
FIG. 5 is a schematic diagram showing a conventional allocation of radio resource within the access portion of a frame structure.
Figure 6:
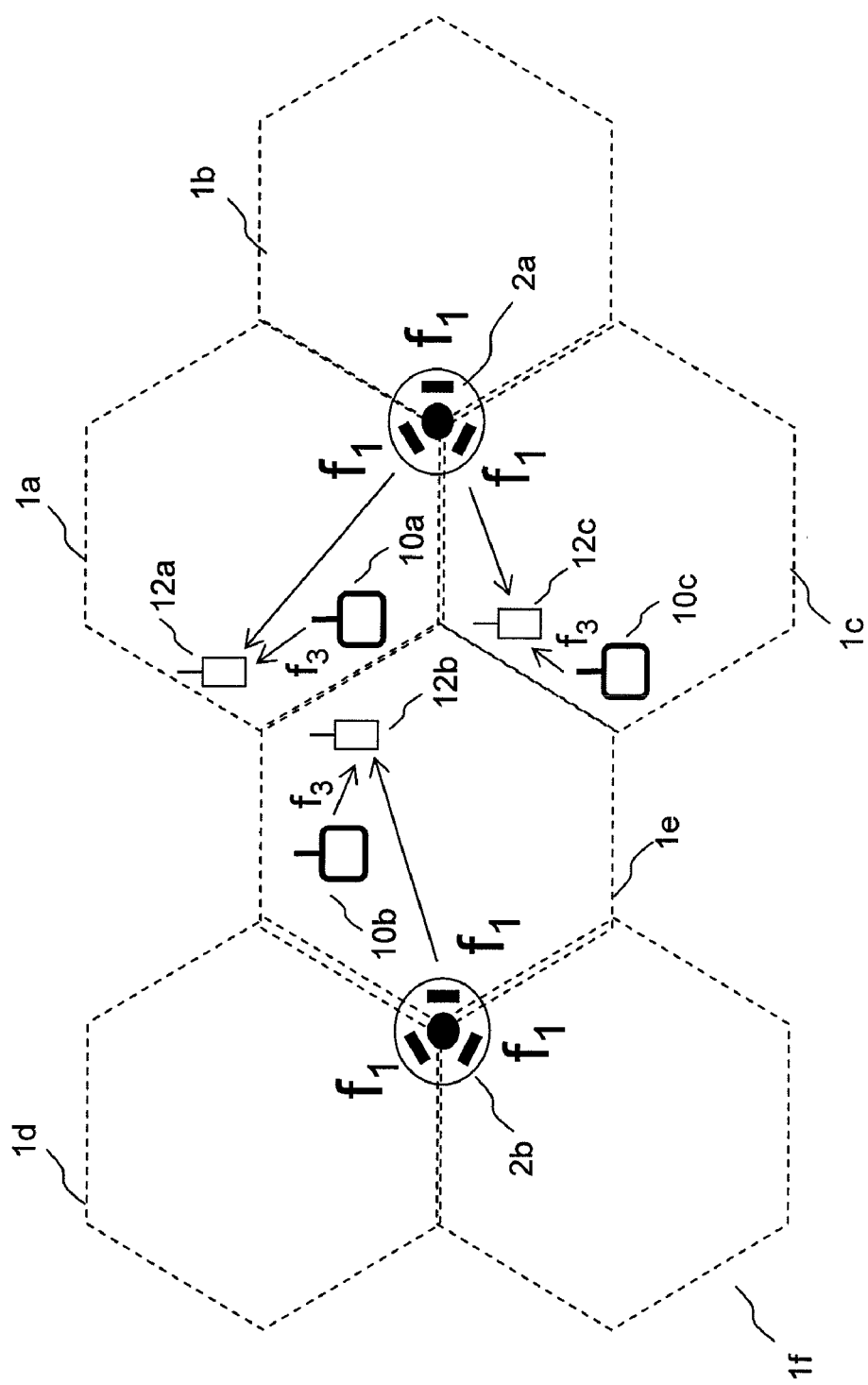
FIG. 6 is a schematic diagram showing the operation of relay stations within a cellular wireless system according to an embodiment of the invention.

FIG. 6 illustrates a similar network to that illustrated in FIG. 5, with an improved frequency re-use scheme according to an embodiment of the invention. In contrast to conventional cellular wireless systems in which the base stations operate within a frequency re-use scheme of n=3, in the system of FIG. 6 the base stations $2a$, $2b$ operate within a frequency re-use scheme of n=1, that is to say, the base stations $2a$, $2b$ operate within the same frequency sub-band as each other. The relay stations $10a$ . . . $10b$ are allocated a different frequency sub-band from that used by the base stations $2a$, $2b$. The relay stations thus also operate with a n=1 frequency re-use pattern with respect to each other. The scheme can be extended to a system comprising a plurality of base stations and a plurality of relay stations, the base stations employing a n=1 frequency re-use scheme with respect to each other and the relay stations also using a n=1 frequency re-use scheme with respect to each other, in a different frequency sub-band to that used by the base stations.

Figure 7:
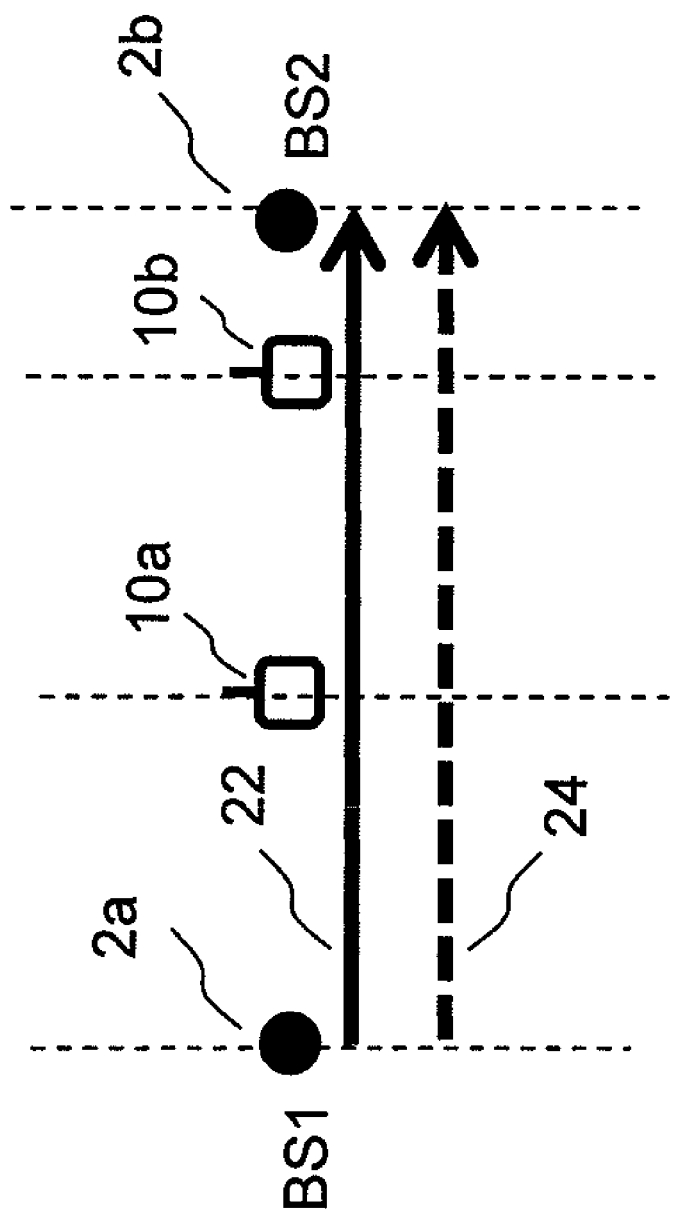
FIG. 7 is a schematic diagram showing two examples of paths of a user equipment moving between the areas of wireless coverage of two base stations and two relay stations.

FIG. 7 illustrates an arrangement of two base stations, designated first base station $2a$ and second base station $2b$ with two relay stations $10a$, $10b$ placed between the first base stations according to an embodiment of the invention. A user equipment (not shown) is moved along a first trajectory 22 that passes relatively close to the base stations $2a$, $2b$ and relay stations $10a$, $10b$ indicated by a solid line and also along a second trajectory 24 that passes relatively far from the base stations $2a$, $2b$ and relay stations $10a$, $10b$ indicated by a dashed line. The base stations $2a$, $2b$ and relay stations $10a$, $10b$ are shown arranged in line for illustrative purposes only; other arrangements are possible.

Figure 9:
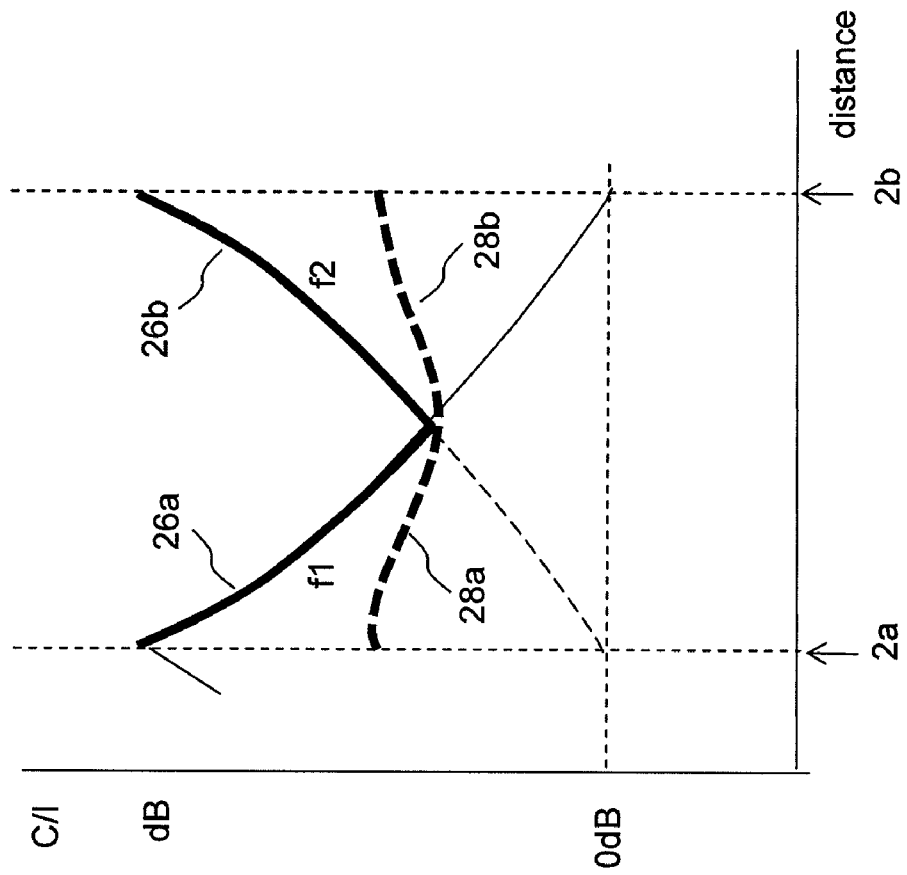
FIG. 9 is a schematic diagram showing the carrier to interference ratio experienced by a user equipment moving along the paths illustrated by FIG. 6 between the areas of wireless coverage of two base stations that are transmitting in different frequency sub-bands.
Figure 8:
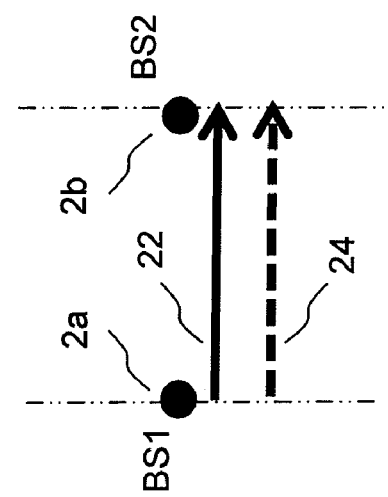
FIG. 8 is a schematic diagram showing two examples of paths of a user equipment moving between the areas of wireless coverage of two base stations.

FIG. 8 illustrates the arrangement of FIG. 7, but without the relay stations $10a$, $10b$, and thus—by way of a comparison—according to conventional arrangements. A user equipment (not shown) moves along a first trajectory 22 that passes relatively close to the first and second base stations $2a$, $2b$ indicated by a solid line and also along a second trajectory 24 that passes relatively far from the first and second base stations $2a$, $2b$ indicated by a dashed line. FIG. 9 shows how the carrier to interference ratio (C/I) received at the user equipment varies as the user equipment travels along the respective trajectories 22, 24 of FIG. 8, in the case where the first and second base stations 2a and 2b are operating at different frequencies designated arbitrarily as f1 and f2 respectively, as would typically be the case within a cellular wireless system operating with a n=3 frequency reuse scheme. The carrier to interference ratio experienced on the first trajectory 22 is shown by the solid line 26a, 26b of FIG. 8 and that experienced on the second trajectory 24 is shown by the dashed line 28a, 28b. The interference may originate from remote base stations re-using the frequency in question.

The exact shapes of the C/I characteristics shown in FIG. 9 depend on the propagation conditions; the curves shown are for illustrative purposes. It should be noted that as the user equipment moves further from the first base station 2a, the signal level received at frequency f1 from the first base station 2a typically falls and the interference, which is typically from distant base stations (not shown in FIG. 8) operating at the same frequency sub band as the first base station 2a, will not fall on average, so that the carrier to interference ratio falls as shown by curves 26a and 26b. As the user equipment terminal moves closer to the second base station 2b, the signal level received at f2 increases and the carrier to interference ratio similarly increases as shown by curves 26a and 26b. At the point where the carrier to interference ratio is higher for the signals received from the second base station 2b than for those received from the first base station 2a, the user equipment hands over from the first base station 2a to the second base station 2b; the curve of carrier to interference ratio against distance is thus the bold solid line 26a, 26b for the first trajectory 22 and the dashed line 28a, 28b for the second trajectory 24. It should be noted that typically, the handover point occurs above a 0 dB carrier to interference ratio; that is to say, the signal power is greater than the interference power.

Figure 10:
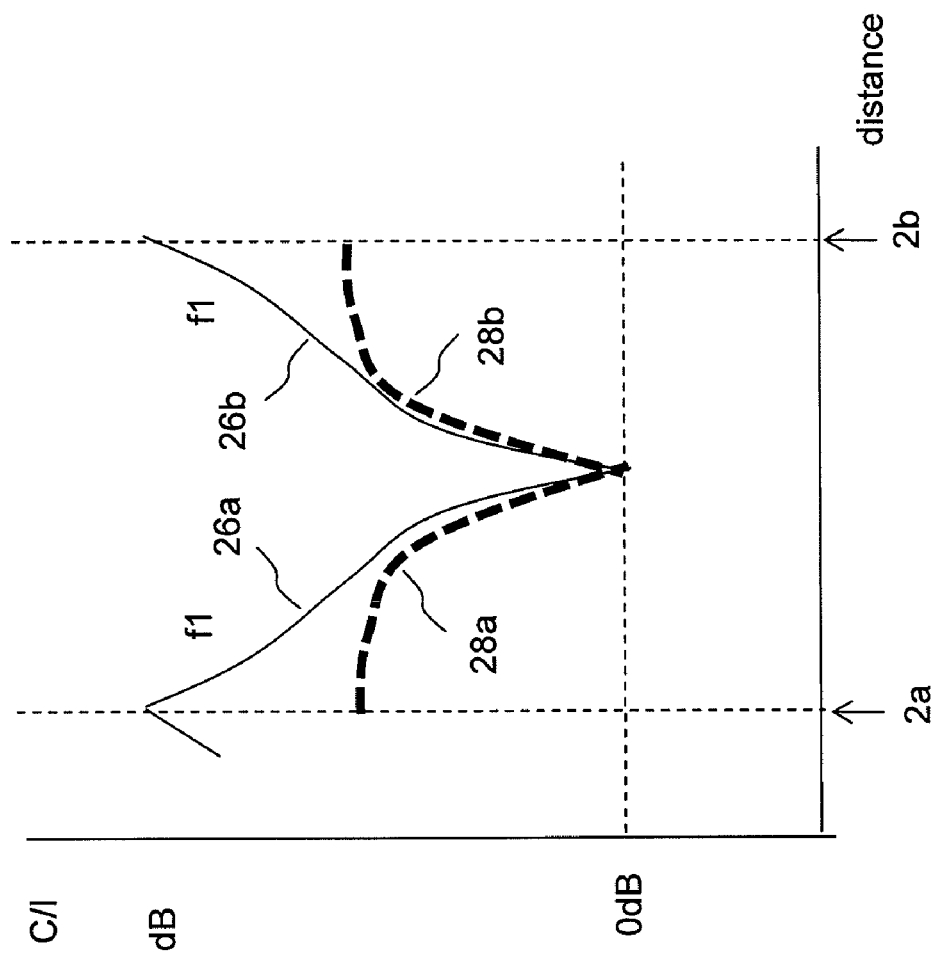
FIG. 10 is a schematic diagram showing the carrier to interference ratio experienced by a user equipment moving along the paths illustrated by FIG. 6 between the areas of wireless coverage of two base stations that are transmitting in the same frequency sub-band.

FIG. 10 shows how the carrier to interference ratio (C/I) received at the user equipment varies as the user equipment travels along the respective trajectories 22, 24 of FIG. 8, in the case where the first and second base stations 2a, 2b are operating in the same frequency sub-band designated arbitrarily as f1, as would typically be the case within a cellular wireless system operating with a n=1 frequency reuse scheme. The carrier to interference ratio experienced on the first trajectory 22 is shown by the solid line 26a, 26b of FIG. 10 and that experienced on the second trajectory 24 is shown by the dashed line 28a, 28b. It should be noted that, since both base stations operate in the same sub-band, each base station appears as interference to the other. Therefore, at the point of handover, the signal and interference will be of at best equal power, that is to say the carrier to interference ratio will be 0 dB at best. This will be true whatever the trajectory between the base stations 2a, 2b; it can be seen from FIG. 10 that the curves 26a, 26b relating to the first trajectory and the curves 28a, 28b relating to the second trajectory both pass through a 0 dB point.

The falling of carrier to noise ratio to 0 dB between base stations operating according to a n=1 frequency reuse scheme generally presents a problem to the operation of a cellular base station since the traffic capacity of a channel, to be shared between user equipments, is related to the carrier to interference ratio. While modern communication systems may be able to operate at a low capacity at 0 dB carrier to interference ratio, this offers a great reduction in capacity compared with regions of coverage away from transitions between base stations, and this is generally not acceptable. As a result, n=1 frequency re-use systems are generally not proposed for high capacity OFDM cellular wireless systems such as WiMax and LTE. However, a n=1 frequency reuse scheme offers potentially a major advantage over a n=3 scheme, in that the whole frequency band is available for use near a base station, rather than nominally a third of the band. As a result the capacity available near to base stations and away from interfering base station can be very high. It will, however, be appreciated that this potential benefit has to be balanced against the problems described above that are encountered at the interfaces between areas of coverage of base stations.

Figure 11:
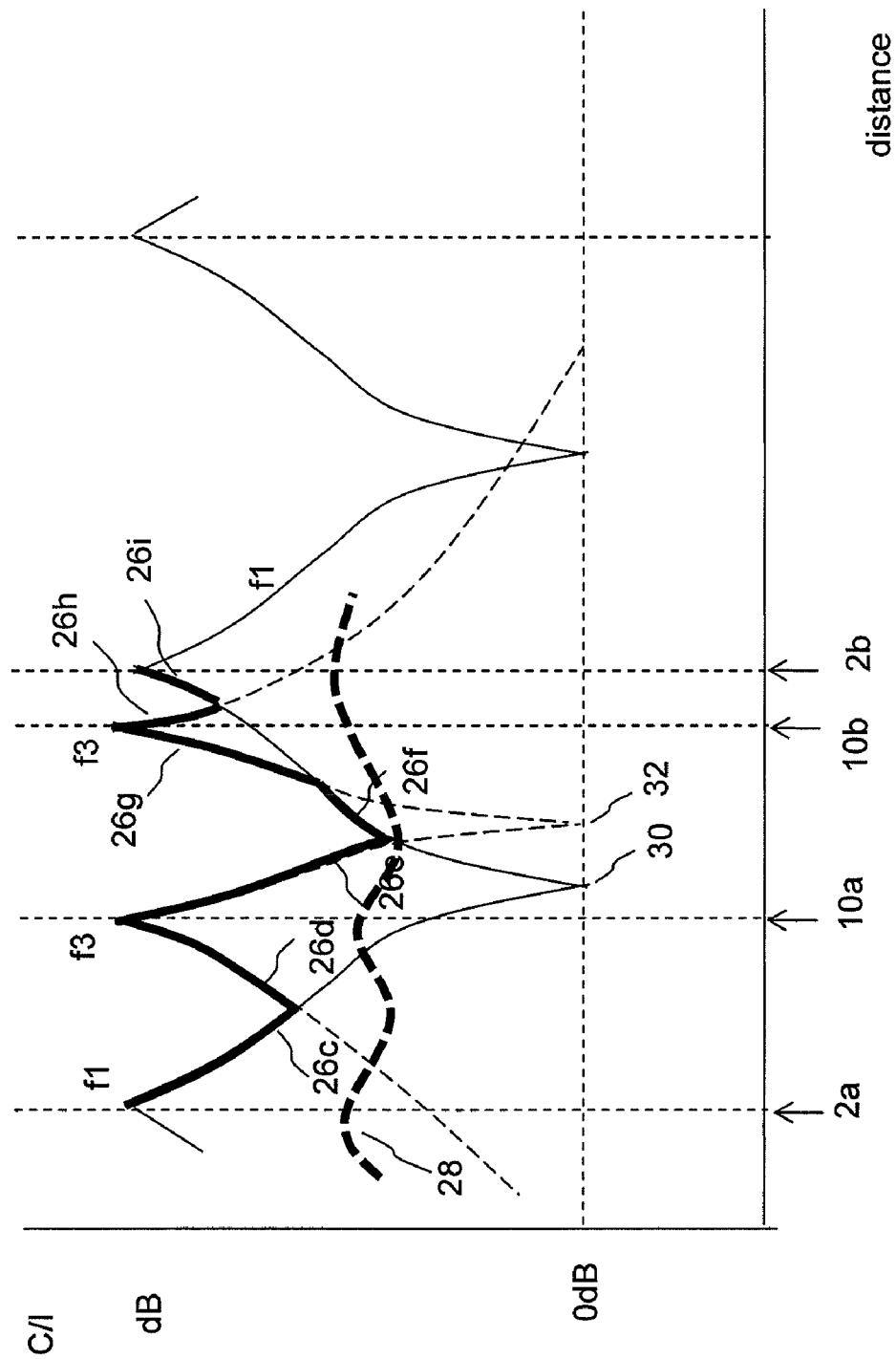
FIG. 11 is a schematic diagram showing the carrier to interference ratio experienced by a user equipment moving along the paths illustrated by FIG. 10 between the areas of wireless coverage of two base stations and two relay stations according to an embodiment of the invention.

Embodiments of the invention provide a relief to the tension between the respective benefit and drawback by arranging relay stations to fill in gaps that would otherwise result in the coverage. This will now be explained with reference to FIG. 11, which shows how the carrier to interference ratio (C/I) received at the user equipment varies as the user equipment travels along the respective trajectories 22, 24 of FIG. 7, and thus according to an embodiment of the invention. In this example, and as described above, the first and second base stations 2a and 2b are operating at the same frequency sub-band designated arbitrarily as f1, and the relay stations 10a, 10b are operating at a different frequency sub-band designated f3. The carrier to interference ratio experienced on the first trajectory 22 is shown by the solid line 26a . . . 26i of FIG. 11 and that experienced on the second trajectory 24 is shown by the dashed line 28. It can be seen that the user equipment hands over to whichever base station 2a, 2b or relay station 10a, 10b has the higher carrier to interference ratio. As a result, it can be seen that carrier to noise ratio can be maintained above 0 dB provided relay stations are positioned such that the 0 dB point 30 that occurs between base station 2a, 2b at f1 does not coincide with the 0 dB point 32 that occurs between relay station 10a, 10b at f3.

Figure 1:
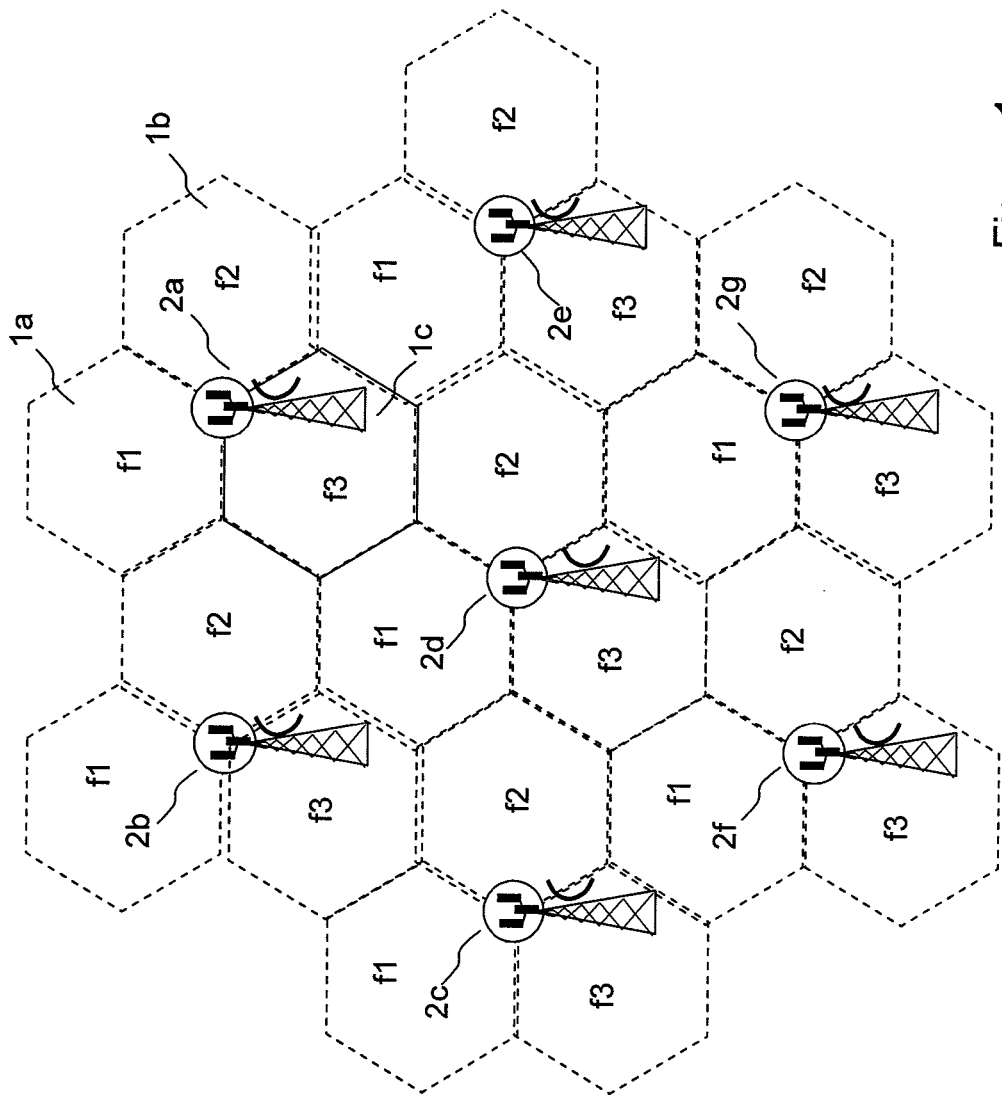
FIG. 1 is a schematic diagram showing a conventional wireless cellular network.
Figure 2:
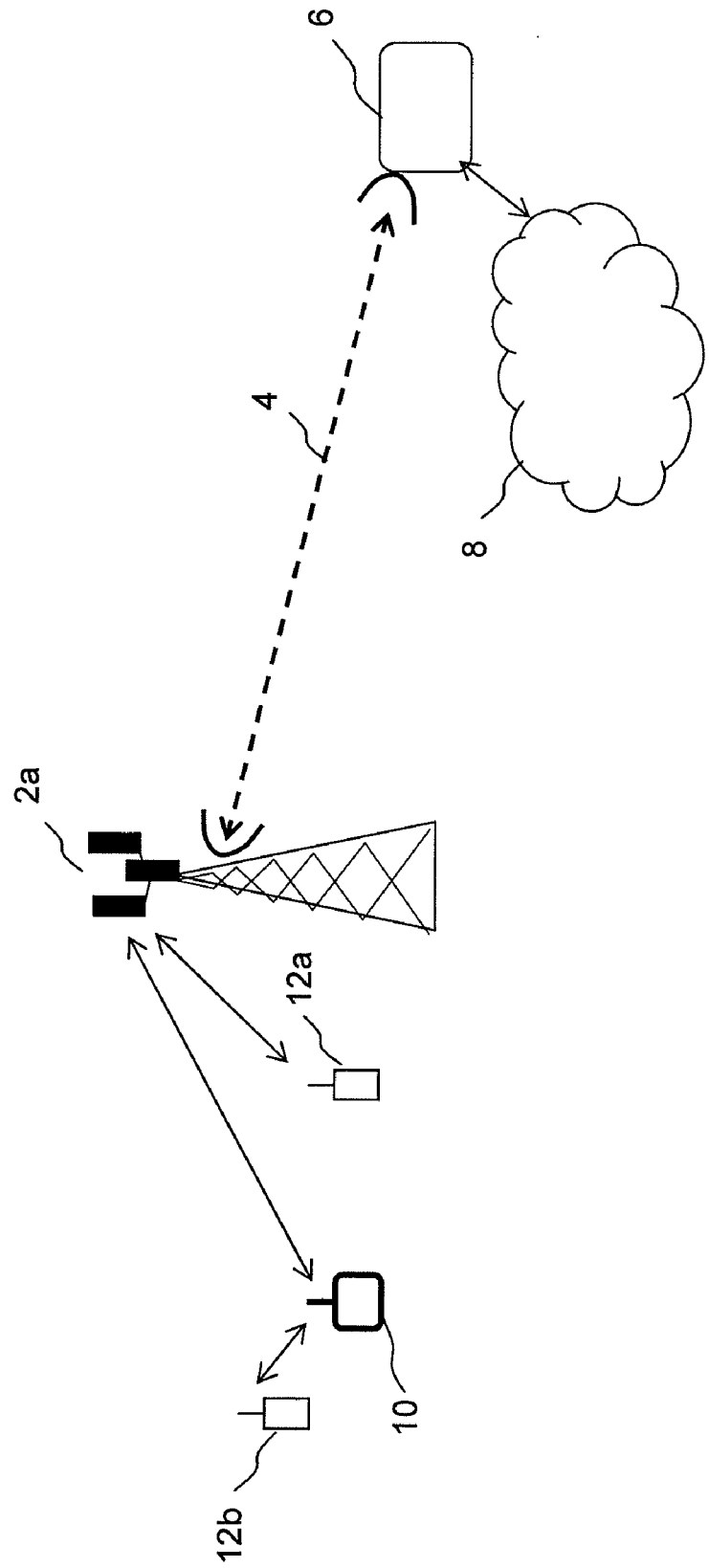
FIG. 2 is a schematic diagram showing a conventional relay node in communication with a base station.
Figure 3:
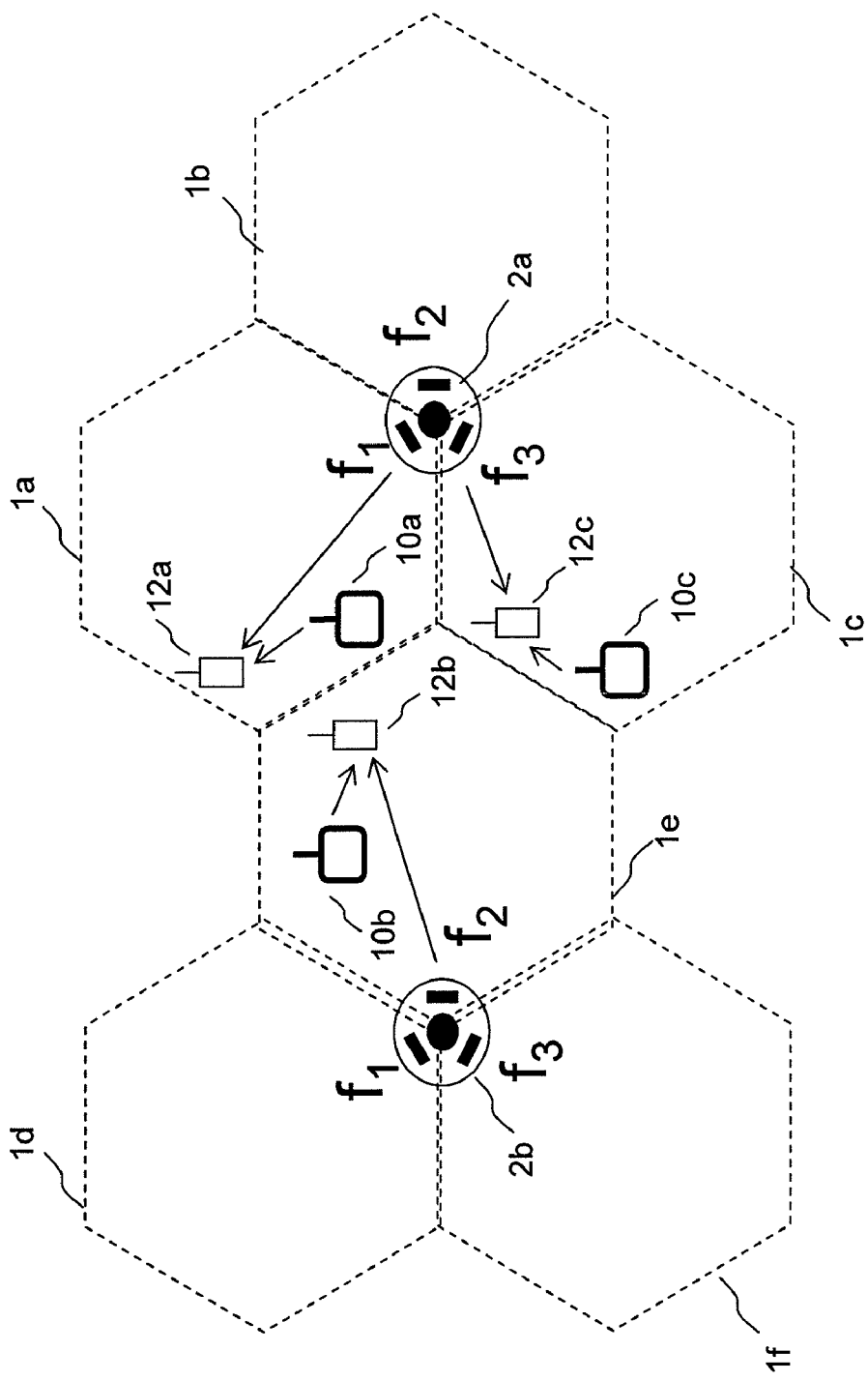
FIG. 3 is a schematic diagram showing a potential method of operation of relay stations within a cellular wireless system.
Figure 4:
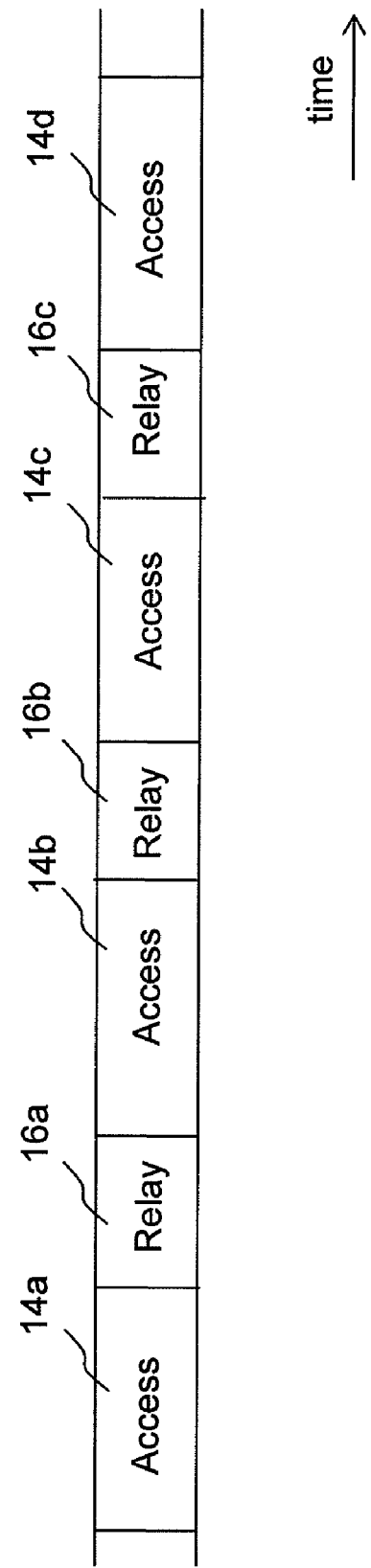
FIG. 4 is a schematic diagram showing a conventional frame structure enabling timesharing between relay and access components.
Figure 12:
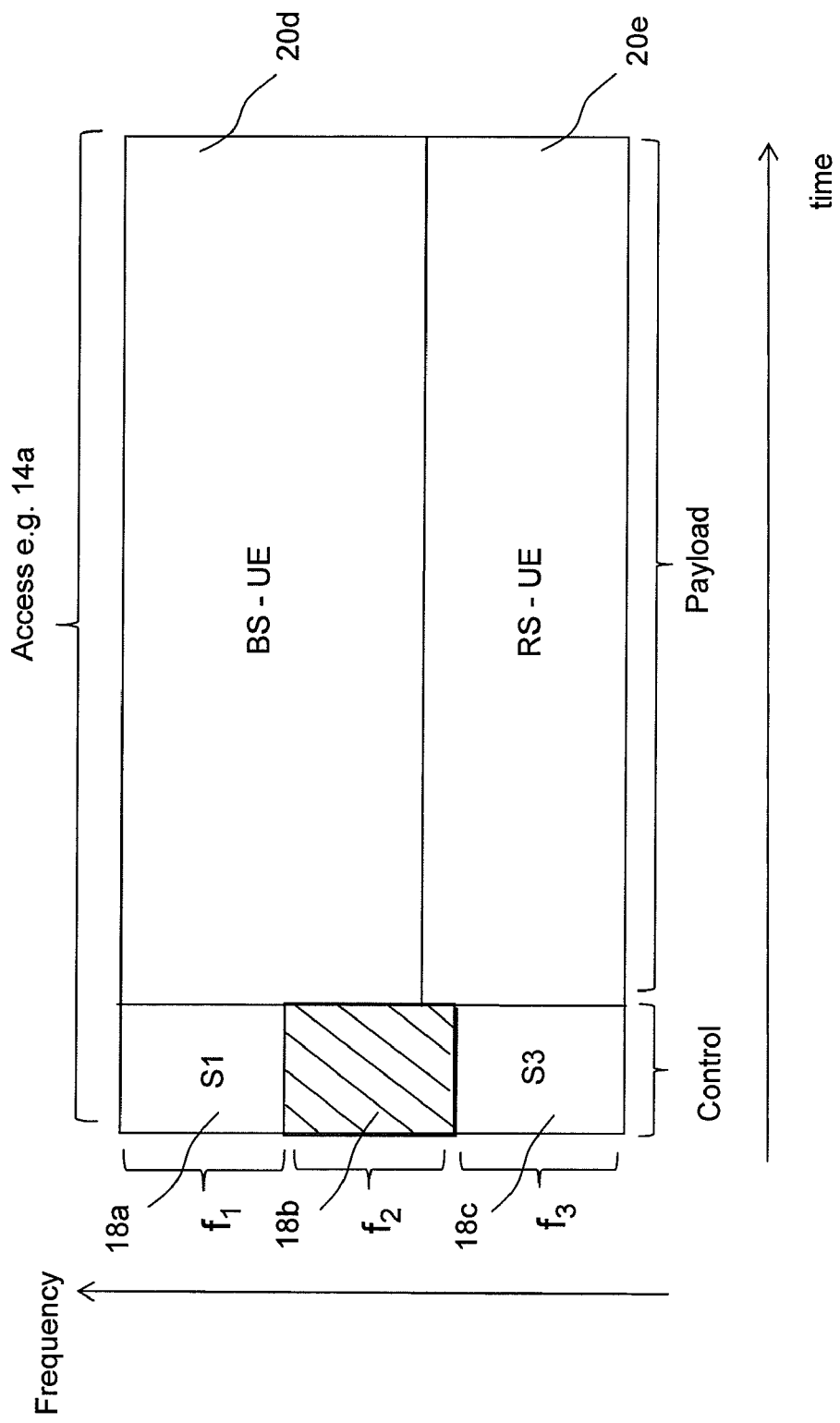
FIG. 12 is a schematic diagram showing an allocation of radio resource according to an embodiment of the invention within the access portion of a frame structure.

FIG. 12 illustrates an allocation of radio resource within an access portion 14a of the data frame of FIG. 3, according to an embodiment of the invention.

Radio resource allocated to control data relating to communication from a base station sector to user equipments operating within the area of coverage of the base station sector is allocated a region S1 18a, and radio resource allocated to control data relating to communication from a relay station to user equipments operating within the area of coverage of the relay station is allocated a region S3 18c, within a different frequency sub-band within the same timeslot. It should be noted that the control timeslot is broadcast to any user equipments within the area of coverage. Not all of the sub-bands available in a timeslot need be used, as can be seen by the presence of the hashed area 18b. It may be convenient to use frequency resource for the control data portion corresponding to that defined in the relevant cellular wireless standard for a n=3 re-use scheme; this has the benefit that operation is facilitated with user equipment that is pre-programmed to expect control data at these frequencies and timeslots within a data frame.

It is not necessary that the payload frequency resource 20d, 20e be divided in frequency with the same split as is used for the control data 18a, 18c. Indeed in order to make optimum use of payload capacity, the division in frequency resource between the portion of payload allocated to the link from the base stations to the user equipment and the link from the relay stations to the user equipment may be determined by a network management system in response to the relative demand for capacity relating to data to be carried by the respective portions. The proportion may be set on a fixed basis, or may be adaptive according to the load conditions. The frequency resource as illustrated by FIG. 12 may be applicable for example to a system built to a WiMax IEEE802.16 standard.

Figure 13:
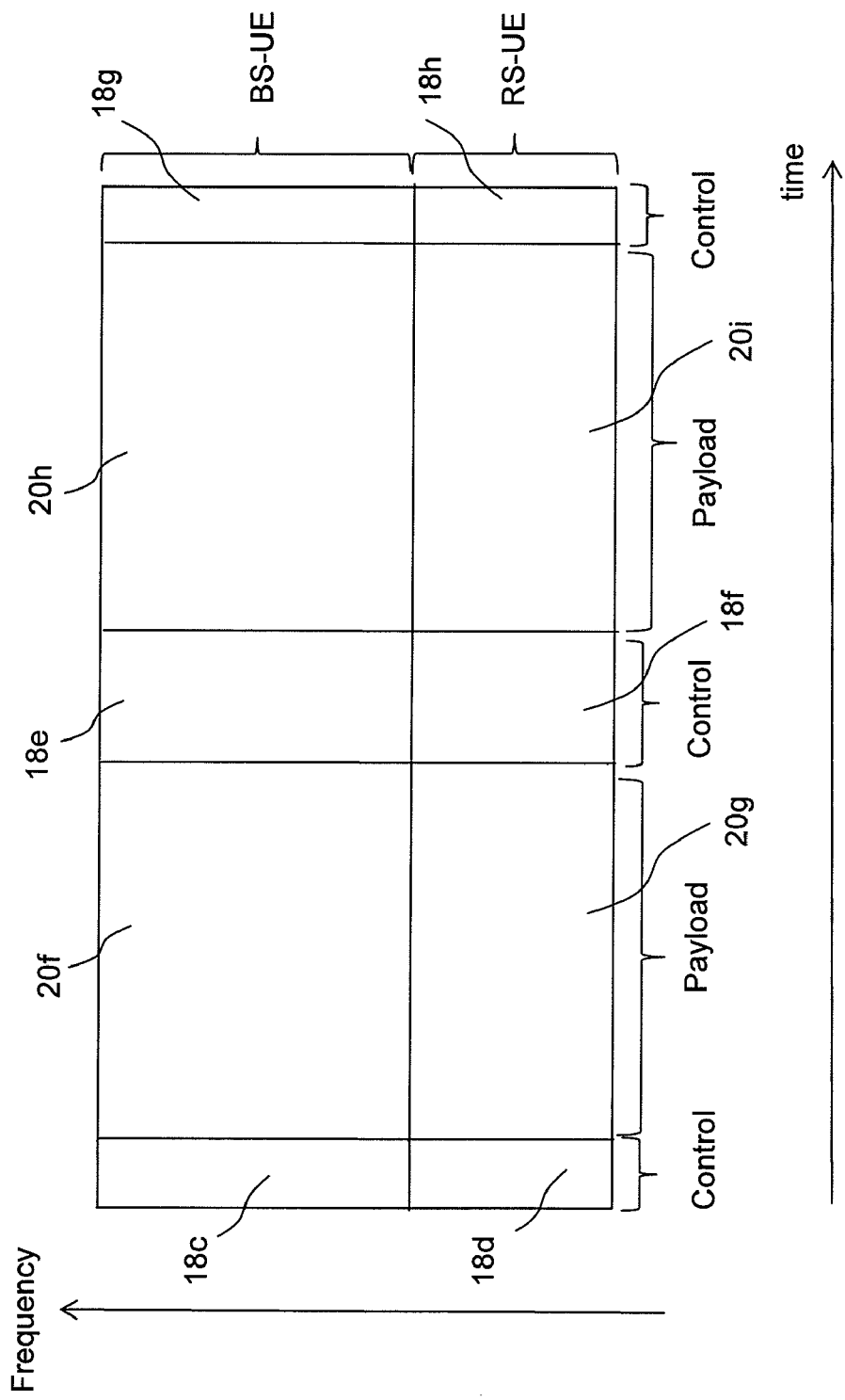
FIG. 13 is a schematic diagram showing an allocation of radio resource according to a further embodiment of the invention within the access portion of a frame structure.

FIG. 13 illustrates an alternative allocation of radio resource to an access portion of the allocation of radio resource, according to a further embodiment of the invention.

Radio resource for control data relating to communication from a base station to a user equipment is allocated regions indicated by reference numerals 18c, 18e and 18g, and radio resource for control data relating to communication from a relay station to a user equipment is allocated to regions indicated by reference numerals 18d, 18f and 18h, within a different frequency sub-band within the same timeslots. As for the embodiment shown in FIG. 12, not all of the sub-bands available in a timeslot need be used; indeed it may be convenient to use frequency resource for the control data portion corresponding to that which are defined in the relevant cellular wireless standard for a n=3 re-use scheme. Radio resource portions indicated by reference numerals 20f and 20h are allocated to the data payload transmitted from base stations to user equipment, and radio resource portions indicated by reference numerals 20g and 20i are allocated to the data payload transmitted from relay stations to user equipment.

Figure 14:
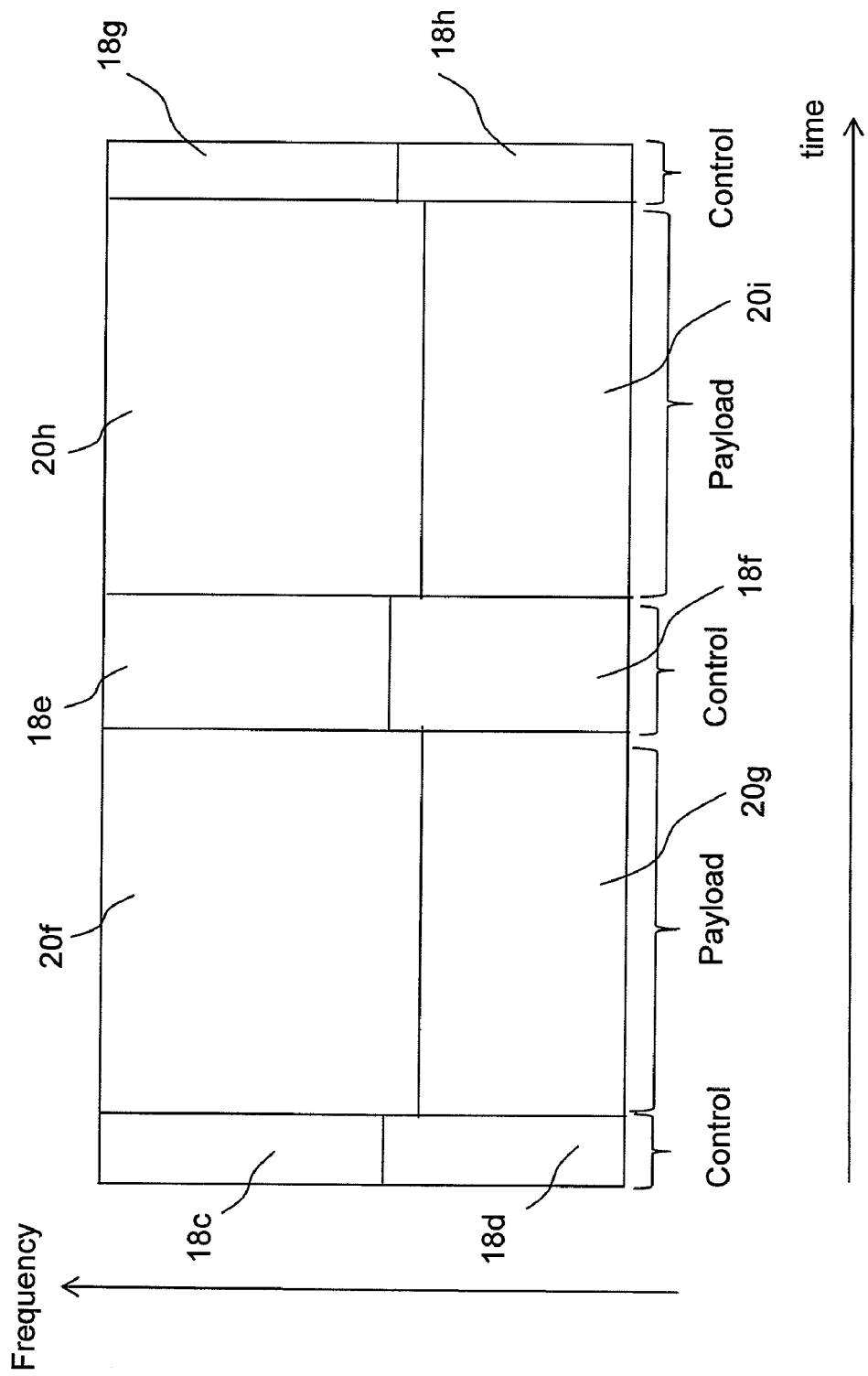
FIG. 14 is a schematic diagram showing an allocation of radio resource according to a yet further embodiment of the invention within the access portion of a frame structure.

FIG. 14 shows a variation of the frequency allocation illustrated by FIG. 13 according to a yet further embodiment of the invention in which the division of the payload frequency resource between portions 20f, 20h relating to transmission from base stations to user equipment and portions 20g, 20i relating to transmission from relay stations to user equipment is determined in a similar manner to that of FIG. 12; to make optimum use of payload capacity, the division in frequency resource between the portion of payload allocated to the link from the base stations to the user equipment and the link from the relay stations to the user equipment may be determined by a network management system in response to the relative demand for capacity relating to data to be carried by the respective portions. The proportion may be set on a fixed basis, or may be adaptive according to the load conditions.

The frequency resource as illustrated by FIG. 13 and FIG. 14 may be applicable for example to a system built to a LTE standard.

It can thus be seen that embodiments of the invention provide a method of increasing the capacity of a cellular wireless system by enabling base stations to operate a n=1 frequency re-use scheme by the deployment of relay stations to provide coverage at the boundaries between the areas of coverage of base stations that would otherwise suffer from interference between signals transmitted from the base stations. The relay stations are themselves deployed in a second n=1 frequency re-use arrangement operating in a different sub-band to that used by the base stations. It is found that the operation of the base stations and relay stations in combination according to this embodiment gives an efficient use the radio resource in terms of increasing capacity compared to a n=3 reuse scheme of base stations alone operating in the same band.

In arrangements according to embodiments of the invention, the areas of poor coverage by relay stations are arranged not to coincide with the areas of poor coverage by base stations. Signals used by relay stations and signals used by base stations are arranged to be orthogonal so that base stations will only cause interference to other base stations and relay stations will only cause interference to other relay stations; there will be no interference between base station signals and relay signals. This will have the effect of de-correlating the locations of the holes in the base station coverage from the locations of the holes in the relay station coverage. Orthogonality between relay station signals and base station signals may be achieved by the use of separate respective frequency bands.

Conventionally, some control signals may be required to be transmitted using the same radio resources by all base stations and relay stations, because user terminals may expect to find them on specified channels. In such cases, mutual interference between base station and relay signals can occur, to the detriment of the system as a whole. Specifically, additional holes in coverage may result in areas where both base station and relay signals are present. According to a preferred arrangement, in a radio resource structure originally designed to support frequency reuse of n=3, one sub-band each can be used for relay station control signals and base station control signals respectively. This maintains orthogonality between base station and relay station signals, and base stations and relay stations each operate with a frequency reuse of n=1. This is preferable to operating base stations and relays with a frequency reuse of n=3 sharing the same channels, as then interference between base station and relay signals can occur. Accordingly, relay stations may be operated in conjunction with base stations such that a rugged control signal can be achieved for both relay stations and base stations while maintaining orthogonality so as to minimise mutual interference and minimise the correlation of their respective coverage patterns, so maximising capacity and coverage.

Embodiments of the invention are also applicable to multi-hop wireless systems, in which backhaul between a relay station and a base station may comprise backhaul via one or more further relay stations or base stations.

It is not required that relay stations use shared radio resource for backhaul; relay stations could in principle use any method of backhaul. For example, a dedicated link to a telecommunications network could be provided using conventional backhaul methods such as a fibre link or a high speed digital subscriber link.

It should be noted that an n=1 frequency re-use scheme is commonly used by code division multiple access (CDMA) systems such as UMPTS release 99. The effects of interference between base stations are mitigated in such a CDMA system by soft handover, in which several base stations or base station sectors simultaneously transmit the same payload data to a user equipment and the user equipment combines the payload data using a combining algorithm; this is a robust system but the data capacity is compromised by the duplication of payload. High capacity OFDM cellular wireless systems such as WiMax and LTE are generally not designed to enable duplication of payload for such soft handoff and so n=1 frequency re-use is conventionally not a feasible option.

Whilst embodiments of the invention have described handover in the context of the evolving LTE and WiMax systems, it will be appreciated that embodiments of the invention are also applicable to other cellular radio systems.

Furthermore, it will be apparent to those skilled in the art that embodiments of the invention may be implemented by a computer readable medium encoded with computer executable instructions for causing a processor to perform the method disclosed.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

13

1. A method of allocating radio resource within a frame structure in a cellular wireless network using orthogonal frequency division multiplexing, the network comprising a plurality of base stations and a plurality of relay stations, the frame structure comprising a plurality of first radio resource elements, formed from a plurality of orthogonal frequency division multiplexing subcarriers, for the communication of payload data, the method comprising:
 allocating one or more elements of the plurality of first radio resource elements formed from a first sub-set of the plurality of orthogonal frequency division multiplexing subcarriers for communication of payload data by the base stations; and
 allocating one or more different elements of the plurality of first radio resource elements formed from a second sub-set of the plurality of orthogonal frequency division multiplexing subcarriers, different from the first sub-set, for communication of payload data by the relay stations,
 wherein a division of the plurality of orthogonal frequency division multiplexing subcarriers into the first sub-set and the second sub-set is determined adaptively according to load conditions.

2. A method according to claim 1, wherein the frame structure comprises a plurality of second radio resource elements formed from the plurality of orthogonal frequency division multiplexing subcarriers for the communication of control data, the method comprising:
 allocating one or more elements of the plurality of second radio resource elements formed from a third sub-set of the plurality of orthogonal frequency division multiplexing subcarriers for communication of control data by the base stations; and
 allocating one or more different elements of the plurality of second radio resource elements formed from a fourth sub-set of the plurality of orthogonal frequency division multiplexing subcarriers, different from the third sub-set, for communication of control data by the relay stations.

3. A method according to claim 1, wherein the radio resource elements are distinguished in at least one of time and frequency.

4. A method according to claim 1, in which the sub-sets of the plurality of orthogonal frequency division multiplexing subcarriers comprise sub-carriers that are not contiguous in frequency.

5. A method according to claim 1, comprising configuring the network such that regions of coverage in which signals transmitted from base stations interfere do not coincide with regions of coverage in which signals transmitted from relay stations interfere.

6. A cellular wireless network using orthogonal frequency division multiplexing comprising a plurality of base stations and a plurality of relay stations, the network being arranged to allocate radio resources within the network in accordance with a frame structure comprising a plurality of first radio resource elements formed from a plurality of orthogonal frequency division multiplexing subcarriers for the transmission of payload data,
 wherein the base stations are configured so as to transmit payload data within one or more elements of the plurality of first radio resource elements formed from a first sub-set of the plurality of orthogonal frequency division multiplexing subcarriers and the relay stations are configured so as to transmit payload data within one or more different elements of the plurality of first radio resource elements formed from a second sub-set of the plurality of orthogonal frequency division multiplexing subcarriers, different from the first sub-set
 wherein a division of the plurality of orthogonal frequency division multiplexing subcarriers into the first sub-set and the second sub-set is determined adaptively according to load conditions.

7. A cellular wireless network according to claim 6, wherein the frame structure comprises a plurality of second radio resource elements formed from the plurality of orthogonal frequency division multiplexing subcarriers for the communication of control data,
 wherein the base stations are configured so as to transmit control data within one or more elements of the plurality of second radio resource elements formed from a third sub-set of the plurality of orthogonal frequency division multiplexing subcarriers and the relay stations are configured so as to transmit control data within one or more different elements of the plurality of second radio resource elements formed from a fourth sub-set of the plurality of orthogonal frequency division multiplexing subcarriers, different from the third sub-set.

8. A cellular wireless network according to claim 6 wherein the radio resource elements are distinguished in at least one of time and frequency.

9. A cellular wireless network according to claim 6, in which the sub-sets of the plurality of orthogonal frequency division multiplexing subcarriers comprise sub-carriers that are not contiguous in frequency.

10. A cellular wireless network according to claim 6, wherein the network is configured such that regions of coverage in which signals transmitted from base stations interfere do not coincide with regions of coverage in which signals transmitted from relay stations interfere.

11. A base station for use in a cellular wireless network using orthogonal frequency division multiplexing, the network comprising a plurality of base stations and a plurality of relay stations, the network being arranged to allocate radio resources within the network to the base stations and the relay stations in accordance with a frame structure, the frame structure comprising a plurality of first radio resource elements formed from a plurality of orthogonal frequency division multiplexing subcarriers for the transmission of payload data,
 wherein the base station is configured so as to transmit payload data within one or more elements of the plurality of first radio resource elements formed from a first sub-set of the plurality of orthogonal frequency division multiplexing subcarriers, the one or more elements being different elements from elements formed from a second sub-set of the plurality of orthogonal frequency division multiplexing subcarriers, different from the first sub-set, the second sub-set being allocated to the relay stations,
 wherein a division of the plurality of orthogonal frequency division multiplexing subcarriers into the first sub-set and the second sub-set is determined adaptively according to load conditions.

12. A base station according to claim 11, wherein the frame structure comprises a plurality of second radio resource elements formed from the plurality of orthogonal frequency division multiplexing subcarriers for the communication of control data,
 wherein the base station is configured so as to transmit control data within one or more elements of the plurality of second radio resource elements formed from a third sub-set of the plurality of orthogonal frequency division multiplexing subcarriers, the one or more elements being different elements from elements formed from a fourth sub-set of the plurality of orthogonal frequency division multiplexing subcarriers, different from the third sub-set, the fourth sub-set being allocated to the relay stations.

13. A base station according to claim 11 wherein the radio resource elements are distinguished in at least one of time and frequency.

14. A base station according to claim 11, in which the sub-sets of the plurality of orthogonal frequency division multiplexing subcarriers comprise sub-carriers that are not contiguous in frequency.

15. A non-transient computer readable medium encoded with computer executable instructions for causing a processor to configure a base station in accordance with claim 11.

16. A relay station for use in a cellular wireless network using orthogonal frequency division multiplexing, the network comprising a plurality of base stations and a plurality of relay stations, the network being arranged to allocate radio resources within the network to the base stations and the relay stations in accordance with a frame structure, the frame structure comprising a plurality of first radio resource elements formed from a plurality of orthogonal frequency division multiplexing subcarriers for the transmission of payload data,
wherein the relay station is configured so as to transmit payload data within one or more elements of the plurality of first radio resource elements formed from a second sub-set of the plurality of orthogonal frequency division multiplexing subcarriers, the one or more elements being different elements from elements formed from a first sub-set of the plurality of orthogonal frequency division multiplexing subcarriers, different from the second sub-set, the first sub-set being allocated to the base stations,
wherein a division of the plurality of orthogonal frequency division multiplexing subcarriers into the first sub-set and the second sub-set is determined adaptively according to load conditions.

17. A relay station according to claim 16, wherein the frame structure comprises a plurality of second radio resource elements formed from the plurality of orthogonal frequency division multiplexing subcarriers for the communication of payload data,
wherein the relay station is configured so as to transmit control data within one or more elements of the plurality of second radio resource elements formed from a fourth sub-set of the plurality of orthogonal frequency division multiplexing subcarriers, the one or more elements being different elements from elements formed from a third sub-set of the plurality of orthogonal frequency division multiplexing subcarriers, different from the fourth sub-set, the third sub-set being allocated to the base stations.

18. A relay station according to claim 16 wherein the radio resource elements are distinguished in at least one of time and frequency.

19. A relay station according to claim 16, in which the sub-sets of the plurality of orthogonal frequency division multiplexing subcarriers comprise sub-carriers that are not contiguous in frequency.

20. A non-transient computer readable medium encoded with computer executable instructions for causing a processor to configure a relay station in accordance with claim 16.

21. A method of allocating radio resource within a frame structure in a cellular wireless network using orthogonal frequency division multiplexing operating within a frequency band having a plurality of orthogonal frequency division multiplexing subcarriers, the network comprising a user equipment terminal, a plurality of nodes of a first type and a plurality of nodes of a second type, different from the first type, the frame structure comprising a plurality of first timeslots for the transmission of payload data and a plurality of second timeslots for the transmission of control data, the method comprising:
configuring the nodes of the first type so as to transmit payload data within a said first timeslot at first selected frequencies corresponding to a first sub-set of the plurality of orthogonal frequency division multiplexing subcarriers; and
configuring the nodes of the second type so as to transmit payload data within said first timeslot at second selected frequencies corresponding to a second sub-set of the plurality of orthogonal frequency division multiplexing subcarriers, different from the first sub-set,
wherein said first selected frequencies are different to said second selected frequencies, thereby enabling reception of payload data from a node of the first type and from a node of the second type at the user equipment terminal within said first timeslot
wherein a division of the plurality of orthogonal frequency division multiplexing subcarriers into the first sub-set and the second sub-set is determined adaptively according to load conditions.

22. A method according to claim 21 comprising:
configuring the nodes of the first type so as to transmit control data within a said second timeslot at third selected frequencies corresponding to a third sub-set of the plurality of orthogonal frequency division multiplexing subcarriers; and
configuring the nodes of the second type so as to transmit control data within said second timeslot at fourth selected frequencies corresponding to a fourth sub-set of the plurality of orthogonal frequency division multiplexing subcarriers, different from the third sub-set,
wherein said third selected frequencies are different to said fourth selected frequencies, thereby enabling reception of control data from nodes of the first and second types within said second timeslot at the user equipment terminal.

23. The method of claim 22, comprising configuring the nodes of the first type and the nodes of the second type such that the first selected frequencies are different to the third selected frequencies and the second selected frequencies are different from the fourth selected frequencies.

24. The method of claim 21, in which the sub-sets of the plurality of orthogonal frequency division multiplexing subcarriers comprise sub-carriers that are not contiguous in frequency.

25. The method of claim 21, comprising operating a node of the first type at a first power level and operating a node of the second type at a second power, wherein the first power level is higher than the second power level.

26. The method of claim 25, comprising configuring a node of the first type as a base station and a node of the second type as a relay station.

27. The method of claim 21, comprising transmitting back haul data from a node of the second type to a node of the first type by use of whichever frequencies are operated by a cellular wireless network corresponding to said node of the first type.

28. A method according to claim 21, comprising configuring the network such that regions of coverage in which signals from nodes of a first type interfere do not coincide with regions of coverage in which signals from nodes of a second type interfere.

29. A method of allocating radio resource within a frame structure in a cellular wireless network using orthogonal frequency division multiplexing, the network comprising a plurality of base stations and a plurality of relay stations, the frame structure comprising a plurality of first radio resource elements for the communication of control data and a plurality of second radio resource elements for the communication of payload data, the method comprising:

allocating one or more elements of the plurality of first radio resource elements formed from a first sub-set of orthogonal frequency division multiplexing subcarriers for communication of control data by the base stations;

allocating one or more different elements of the plurality of first radio resource elements formed from a second sub-set of orthogonal frequency division multiplexing subcarriers, different from the first sub-set of orthogonal frequency division multiplexing subcarriers, for communication of control data by the relay stations; and allocating one or more elements of the plurality of second radio resource elements formed from a third sub-set of orthogonal frequency division multiplexing subcarriers for communication of payload data by the base stations, wherein the third subset of orthogonal frequency division multiplexing subcarriers is allocated more orthogonal frequency division multiplexing subcarriers than are allocated to the first sub-set of orthogonal frequency division multiplexing subcarriers.

* * * * *